US011989501B1

(12) United States Patent
Gregory (10) Patent No.: US 11,989,501 B1
(45) Date of Patent: May 21, 2024

(54) BINARY OBJECT BUFFERS ENCODING FORMAT

(71) Applicant: Zoox, Inc., Foster City, CA (US)

(72) Inventor: James Peter Gregory, Berkeley, CA (US)

(73) Assignee: Zoox, Inc., Foster City, CA (US)

( * ) Notice: Subject to any disclaimer, the term of this patent is extended or adjusted under 35 U.S.C. 154(b) by 287 days.

(21) Appl. No.: 17/446,891

(22) Filed: Sep. 3, 2021

(51) Int. Cl.
*G06F 40/126* (2020.01)
*G06F 40/149* (2020.01)

(52) U.S. Cl.
CPC .......... *G06F 40/126* (2020.01); *G06F 40/149* (2020.01)

(58) Field of Classification Search
CPC .............................. G06F 40/126; G06F 40/149
See application file for complete search history.

(56) References Cited

U.S. PATENT DOCUMENTS

| | | | | |
|---|---|---|---|---|
| 9,166,863 B2 * | 10/2015 | Vermeulen | ............ | G06F 16/184 |
| 10,045,089 B2 * | 8/2018 | Jeong | ................. | H04N 21/6547 |
| 11,095,774 B1 * | 8/2021 | Willshire | ............... | H04L 67/133 |
| 2010/0166065 A1 * | 7/2010 | Perlman | ............... | H04N 19/107 |
| | | | | 375/E7.173 |
| 2017/0099332 A1 * | 4/2017 | Bullotta | ................. | H04L 67/02 |
| 2019/0174131 A1 * | 6/2019 | Abe | ....................... | H04N 19/13 |

* cited by examiner

*Primary Examiner* — Sm A Rahman
(74) *Attorney, Agent, or Firm* — EIP US LLP (57) ABSTRACT

A computer-implemented method is provided. The computer-implemented method comprises: determining data to be encoded, the data comprising data elements that each have a corresponding type, length, and value; determining a list of values of data elements having a first type; encoding the list as a first portion of encoded data including an indication of the first type, the length of each value, and the value; encoding the plurality of data elements as a second portion of encoded data, wherein for each data element whose value is included in the list of values, the second portion includes an indication of a position of the value in the list, and wherein for each data element having a second type, the second portion includes an indication of the type, an indication of the length, and an indication of the value; and transmitting the encoded data for storage and/or decoding.

20 Claims, 5 Drawing Sheets

BINARY OBJECT BUFFERS ENCODING FORMAT

BACKGROUND

It is common for data to be shared between different components of a computing system. For example, the same data may be shared between different software applications, with each software application performing its own processes on the data. In order for each component of the computing system to use the data effectively, the data first needs to be communicated to the component and to be formatted to be readable to the component.

BRIEF DESCRIPTION OF DRAWINGS

The detailed description is described with reference to the accompanying figures. The use of the same reference numbers in different figures indicates similar or identical components or features.

DETAILED DESCRIPTION

This disclosure describes a data format, as well as encoding and decoding methods, systems, and computer-readable media, that are suitable for efficient data exchange. The data format, which may be referred to as a serialization format, is useful for exchanging data between different components of a computing system, and may be particularly useful with data relating to actual objects in 3D spaces and/or video data. 3D data or video data may comprise a large number of data objects that need to each be precisely and efficiently communicated between components. Accordingly, the data format described herein may enable efficient encoding and decoding of data objects used in 3D or video data to minimize the size of the data being communicated without loss of precision.

Generally, data for encoding and decoding using the techniques described below may comprise a plurality of data objects that, e.g., represent the actual objects in the 3D space or video data. Data objects may be, for example, arrays, associative arrays, or single values. The data objects, when represented in code, may comprise one or more data elements that are used to define the data object. The data elements may comprise, for example, identifiers and/or keys and values forming key-value pairs. Data elements may also comprise features of or indicators of data type used in the data, such as array indicators. In some programming languages, array indicators may comprise braces or brackets. An identifier may be a string or a number that uniquely identifies the data object and that is re-used as properties of the actual object change. For example, the actual object represented by the data object may move through an environment causing properties associated with its location to change. However, the identifier associated with the actual object remains the same. The data objects may have one or more associated properties whose values change over time. A set of values for the associated properties may represent the state of the object at a point in time. For example, the values may denote the locations of the object in the environment. Values may be associated with a corresponding key to create a key-value pair.

For example, a JavaScript® data object may have an identifier, which may be referred to as a variable of the data object. The identifier may be used to identify and call the data object. The JavaScript® data object may have one or more properties that corresponds to the identifier, which may comprise a value or a key-value pair. Key-value pairs may also be referred to as name-value pairs. In a JavaScript® data object, braces or brackets may be used to indicate a data element such as, e.g., an array or an associative array.

A data element may be defined by a data type of the data element, a length of the data element, and an associated value of the data element. The data type of the data element is a classifier for the data, indicating to components that are interpreting the data element how the data element is used within the data object. For example, a sequence of characters such as 'HELLO' may have a string data type, while a sequence of numbers may have a number or integer data type. The data types that an element may take depend on the associated programming language and notation. The length of the data element indicates the size in, e.g., bytes of the data element. For example, the sequence of characters 'HELLO' may have a length of 5 bytes. The associated value of the data element indicates a characteristic of the data element. The associated value of 'HELLO' is HELLO, although the associated value of the data element may be represented in a different format, such as binary for example. The associated value differs from a value of a key-value pair. That is, that any element may have an associated value. For example, in an associative array, the data type may be an associative array, the length may correspond to the number of elements in the array, and the associated value of the associative array may be the properties within the array. The term 'value' will be used below to refer to both values of key-value pairs and the values that define data elements. Which of the two meanings is intended will be clear from context, although where there may be ambiguity, the meaning will be clarified by inclusion of a reference to a key-value pair or to a data element. For example, a 'data element value' may be referred to so as to indicate values defining data elements, while a key-value pair value may be referred to so as to indicate values of a key-value pair.

Data from a first component, which may be a software application or a computing device, and comprising a plurality of data objects may be encoded to produce encoded data. The data is encoded by formatting the data into a binary format. In the binary format, each data element is encoded to indicate a data type of the element, a length of the data element, and a value of the data element. A format that indicates the type, the length, and value may be referred to as a type-length-value scheme. The encoded data may be transmitted as a data stream for decoding to retrieve the data objects for use by a second component. The encoded format may comprise one or more fields for each element, in which the data type, the length, and the value are indicated. Each field may comprise a binary value representing the data being encoded.

In some examples, encoding a plurality of data objects may involve generating a list of data element values of a particular data type for use as an index or look-up table. References back to the list may be used in the encoded data when the values in the list appear in the data. The list may comprise an entry for each value of the particular data type. That is, each value in the list may be unique to the list, but may be repeated within the data.

In some examples of a list of values, values of data elements that are string data, such as identifiers or keys, may be included in the list. String data such as identifiers and keys are repeatedly used in, e.g., 3D or video data as objects move through an environment and as properties of the data objects change. Based on the list, the encoded data may be considered to include two portions, at least, with the list being encoded as a first portion and the body of the data being included as the second portion. The second portion includes the references to the first portion. In some examples, the first portion is part of a header of the encoded data. The second portion may be referred to as the payload or body of the data. In some examples, the first portion may also be part of the payload.

In some examples, only values of the data type that is particular to the list may be encoded in the list of values. In these examples, elements of other data types, that are not the data type that may be encoded in the list, are encoded in the second portion only, without reference to the list of values.

The provision of a list that acts as a look-up table provides a speed advantage during decoding, particularly where the data type included in the list is typically slow to decode in the target computer application, or where the values of the data objects are often repeated. As noted above, the identifiers may be reused as an object moves through an environment. Re-encoding the identifiers each time they are reused is inefficient, and so the list enables a reduction in the amount of data being encoded as well as an improvement in speed when decoding, because the identifier of each object need only be decoded once.

The list may be encoded in the binary format using the type-length-value scheme. The list may be encoded as an array, whereby the data type indicates an array data type, the length is the length of the array, and the value is the list. Each value in the list may also be encoded using the type-length-value scheme, and may be nested within the 'value' part of the encoded array.

In some aspects, the data type may be encoded using a type code, which corresponds to the data type of the data element being encoded. A type code may comprise a numeric value or a string value that represents the data type in a shortened form. The type code may be provided in the encoding in a binary format thereby forming a field indicating to the data type. Type codes may be determined by reference to a schema that links types of data and their associated type codes. In some examples, the schema may be determined based on the data being encoded. The schema may therefore contain type codes and data types that are specific to the data being encoded. The data format may be considered to be a schemaless data format, because is the format does not require a predefined structure to the data elements. Any type of data may therefore be encoded using the techniques described herein and the encoder operates independently of data type, referring to the schema to determine which type code is the appropriate type code. In other words, any schema may be used, depending on the data types the data being encoded includes.

In some examples, the use of type codes to represent data type may be useful in reducing the size of the data. The type codes may be set for each data type so that they occupy only a single byte when encoded. In some examples, one type code may correspond to one type of data. In some examples, a plurality of type codes may correspond to one type of data.

In some examples, a type code may also refer to features of the data element other than the type of data. For example, a type code may be used to refer to specific values that are commonly found in the data, such as null or zero values. In these examples, the type code therefore indicates each of the type, the length, and the value of the data element, thereby reducing the amount of data to encode these values. In other examples, a type code may refer to specific Boolean values, such as TRUE or FALSE.

In some examples, a type code may refer to both a type and a compression of a value of the data element when encoded. For example, if the value of the data element has a particular length but can be compressed to have a smaller length, the type code may indicate this, before the value of the data element is encoded using the smaller length. By indicating features other than type, such as compression, the length of the encoded data element may be reduced compared to its unencoded length. This does not mean that the original length is no longer retrievable, however, because the original value at its original length may be recovered during decoding because the type code indicates the compression that has been applied, and the data can be decompressed to achieve the original length.

The number of fields encoded for each element may therefore vary depending on the data type and the value of the data. For example, as described above, different data types may be represented by type codes in a field, and particular data types such as Boolean data types may be represented by a single type code. Accordingly, only one field is used for encoding the Boolean data, and the field includes a type code corresponding to the data type and value. For other elements, two fields may be used to represent the element, for example, where a type code in a field indicates both a data type and a length. For other elements, three fields may be used, with each field corresponding to one of the data type, the length, and the value.

In some aspects, encoding the data may be implemented using one or more buffers in which data is stored as it is read by an encoder. In some examples, a plurality of buffers are used. In some examples, a first buffer may be used to encode a first portion of encoded and a second buffer may be used to encode a second portion of encoded. The second portion of data may be appended to the first portion.

In some aspects, the encoding format described above may also incorporate features to improve the precision of the encoding and/or decoding. For example, where it is determined that a value is larger than a particular size, such as 32 bits, a precise encoding format may be used to ensure that there is no loss of data due to rounding or approximation. An example of this is where JavaScript® data elements are encoded and comprise numbers that have a 'BigInt' data type. To ensure that there is no loss in precision, BigInt data elements and 64-bit integer data elements are encoded with a type code that indicates that they are to be specifically encoded as 64-bit integers.

The aspects described herein may be particularly useful for decoding JavaScript® data. Generally, existing formats such as JSON or Protocol Buffers are slow to decode particular types of data in JavaScript®, especially where the volume of data is high and where data such as strings are often repeated. Furthermore, existing formats may also, in some circumstances, lose precision when encoding integers larger than 32 bits, because they default to decoding these integers as double precision floating point numbers. However, where the integers are larger than 56 bits, this default to double precision floating point numbers may cause approximation of the values when decoding.

Figure 1:
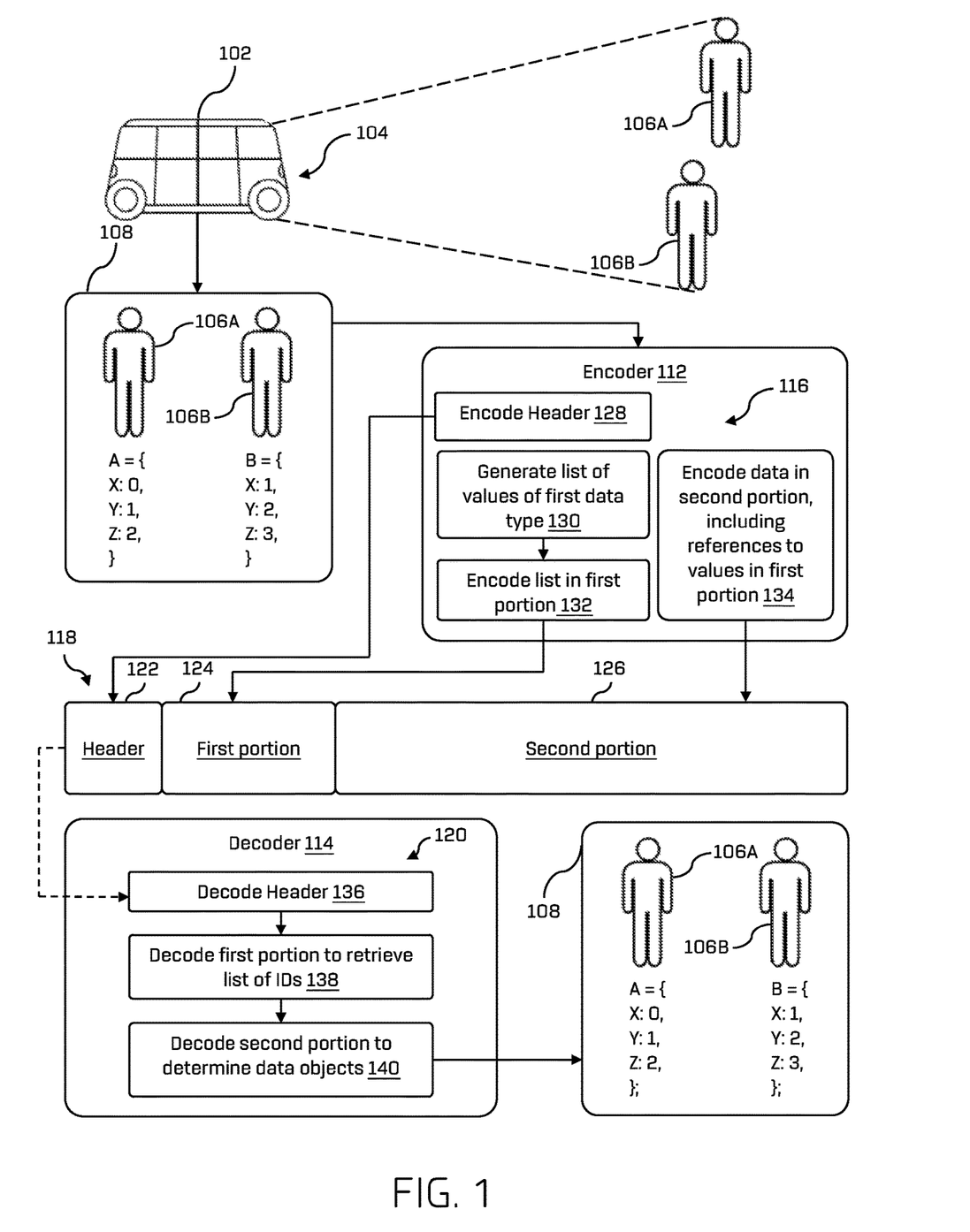
FIG. 1 is a pictorial diagram of a method of encoding data into an encoded format and decoding the data from the encoded format.

FIG. 1 shows a pictorial representation of encoding data and decoding data according to aspects of the invention. A vehicle 102 is shown in FIG. 1. The vehicle may be an autonomous vehicle. The vehicle may include a vehicle computing device and may be part of a vehicle system that includes one or more remote computing devices.

Figure 2:
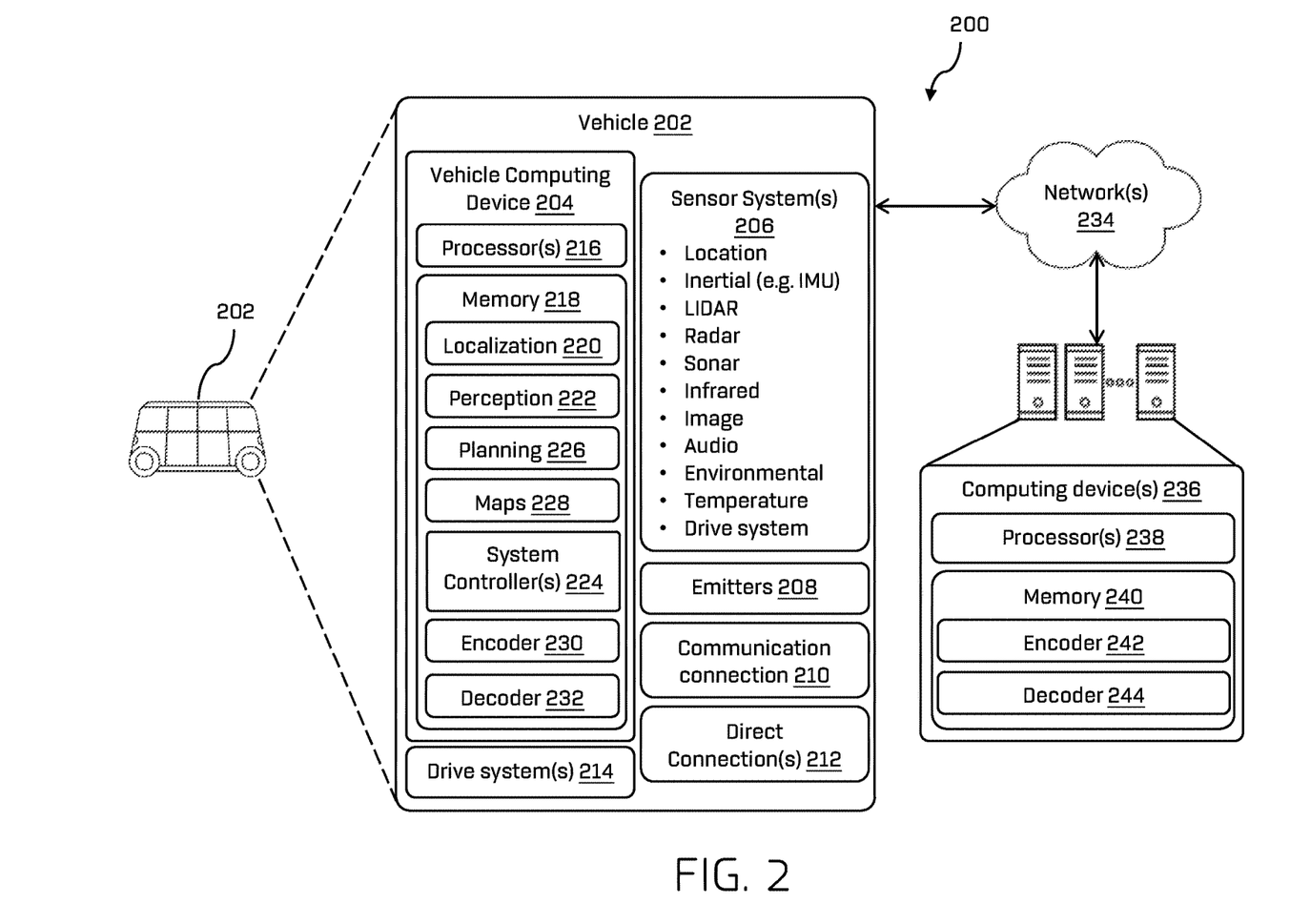
FIG. 2 depicts a block diagram of an example vehicle system.

An example of a vehicle system 200 is depicted in FIG. 2. In some instances, the vehicle system 200 may include a vehicle 202, which may correspond to the vehicle 102 of FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 202 may be a fully or partially autonomous vehicle having any other level or classification. Moreover, in some instances, the techniques described herein may be usable in conjunction with non-autonomous vehicles as well.

The vehicle 202 may include vehicle computing device(s) 204, one or more sensor systems 206, one or more communication connections 210, at least one direct connection 212 (e.g., for physically coupling the vehicle 202 to exchange data and/or to provide power), and one or more drive systems 214.

In some instances, the sensor(s) 206 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 206 may include multiple instances of each of these or other types of sensors. For instance, the LIDAR sensors may include individual LIDAR sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204.

Returning now to the example of FIG. 1, one or more sensors, such as sensors 206, may be included in the vehicle 102 in order to detect objects and data relating to those objects in the environment surrounding the vehicle. For example, as shown in FIG. 1, sensors (not shown) provided at an end 104 of the vehicle 102 may be configured to monitor the environment in front of the vehicle 102. In the example shown in FIG. 1, two objects, pedestrians 106A and 106B, are present in the environment in front of the end 104 of the vehicle 102. The sensors may be configured to detect the pedestrians 106A and 106B as well as data relating to the pedestrians such as their position within the environment and/or data relating to their movement within the environment.

The sensors of the vehicle 102 of FIG. 1 may be configured to provide the data as inputs to a vehicle computing device, such as the vehicle computing device(s) 204 of FIG. 2, and particularly to one or more processors for use in operating components stored in memory of the vehicle computing device. As can be seen from FIG. 2, the vehicle computing device(s) 204 may include one or more processors 216 and memory 218 communicatively coupled with the one or more processors 216. In the illustrated example, the memory 218 of the vehicle computing device(s) 204 stores a localization component 220, a perception component 222, a planning component 226, one or more maps 228, and one or more system controllers 224. Though depicted in FIG. 2 as residing in memory 220 for illustrative purposes, it is contemplated that the localization component 220, perception component 222, planning component 226, and/or the one or more maps 228 may be accessible to the vehicle 202 (e.g., stored on, or otherwise accessible by, memory remote from the vehicle 202).

An example of this remote memory is the computing device 236. The computing device 236 may include one or more processors 238 and memory 240. Although not depicted here, in some instances the computing device 236 may store the above-referenced components and controllers. The processor 216 may access these as required from the computing device 236 via the network 234 that connects the vehicle 202 and the computing device 236.

In some examples, the vehicle 202 may send operational data, including raw or processed sensor data from the sensor system(s) 206, to one or more computing device(s) 216 via the network(s) 234.

In some instances, the perception component 222 may include functionality to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception component 222 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

Returning to FIG. 1, the sensors of the vehicle 102 may provide the data relating to the objects in the environment, i.e. pedestrians 106A and 106B, as inputs to a perception component of the vehicle computing device, such as perception component 222. The perception component may use the data to perform object detection, segmentation, classification, and other data processing to determine characteristics about the objects.

The perception component may assign identifiers to the objects sensed in the environment to enable the object to be tracked within the environment. The perception component may determine values associated with the objects based on the data received from the sensor, to create a data object for each of the objects. It will be appreciated that, although the objects are physical objects sensed in a real-world environment by the vehicle in this example, in other examples the objects may be objects displayed and used in a simulation, or may be objects identified within video data. Simulation data may be received from a planning component such as planning component 226 or localization component such as localization component 220, or from a remote device, such as remote computing device 236. In some examples, the data may comprise map data received from the maps 228 or the other components in memory.

The data objects are shown in FIG. 1 as parts of data 108. In the data 108, two data objects are shown, one for each of the pedestrians 106A and 106B in FIG. 1. In the example of FIG. 1, the data 108 comprises JavaScript® data objects. While JavaScript® data objects are represented in this example, data objects of any programming language or notation may be used with the methods and systems described herein. Furthermore, the values of the elements depicted in FIG. 1 are used for the purposes of this example only, and in general any values of elements of the data may be used with the techniques of the present application.

Each of the JavaScript® data objects in data 108 includes a plurality of data elements. Taking the data object associated with pedestrian 106A as an example, the data object includes a data element comprising an identifier. The identifier has a value of 'A', meaning that the data type is a string data type and the length is 1. The data object also includes further data objects, including a plurality of properties, comprising key-value pairs, within an associative array that corresponds to the identifier A. The correspondence with the identifier A is indicated by the equals sign, as is conventional in JavaScript® notation. The associative array is indicated by the curly brackets, { }, enclosing the properties. Within the array, a first key-value pair has the key 'X' and the value 0, a second key-value pair has the key 'Y' and the value 1, and a third key-value pair has the key 'Z' and the value 3. The correspondence between the keys and values of the key-value pairs is indicated by a colon and the key-value pairs are separated by commas, as is conventional in JavaScript® notation. The data object corresponding to the pedestrian 106B has an identifier 'B' and includes the same keys but different values.

The keys in this example may be considered to represent, for example, coordinate data of the pedestrians within a defined 3D environment. In some examples, keys associated with an identifier may be part of a vector of the object, such as a velocity vector, or may be part of a static contour of the object. In some examples, a key associated with an identifier may be a timestamp, to indicate the moment in time that the values corresponding to the other keys were determined. The keys and their values may vary, and may depend on, for example, the type of data being gathered, the type of sensors being used to gather the data, the type of objects to which the data relates.

The values of the key-value pairs represent the state of the keys at a particular point in time. At a different point in time, the objects may have changed their position, velocity, or other values relating to their associated keys. Accordingly, at the different moment in time, the identifier of the data object may remain the same, but the values of the key-value pairs may be different. FIG. 1 is intended to represent a single moment in time only, for ease of explanation and illustration, but it will be appreciated that in some examples the data may comprise a plurality of different values for the same keys for each data object, with each value corresponding to a particular point in time.

The data gathered may be communicated from a starting, first component, e.g., the processors of the vehicle, to a target, second component, such as a different device, different hardware, or different software. The term component is here used to refer to devices, hardware, software, or other features of a computing system to which data may be transferred, and is distinct from the use of component in relation to the software components of the vehicle such as the perception, localization, or planning components. It will be apparent from the context in which the term component is used which of these is being referred to. In some examples, the data may be transferred between two software applications. The software applications may operate within the vehicle computing device and be stored in memory of the vehicle computing device, or may be in remote computing devices. For example, referring to FIG. 2, the data may be transferred from the perception component 222 to other software components stored in the memory 218 of the vehicle, such as the localization component or planning component 226. In some instances, the data may be transferred from the perception component 222 to the remote computing device 236 via the communication connection 210 and network 234.

To briefly explain, the localization component 220 may be configured to receive data from the sensor system(s) 206 to determine a position and/or orientation of the vehicle 202 (e.g., one or more of an x-, y-, z-position, roll, pitch, or yaw). For example, the localization component 220 may include and/or request/receive a map 228 of an environment and may continuously determine a location and/or orientation of the autonomous vehicle within the map 228.

In at least one example, the planning component 226 may determine a location of a user based on image data of an environment received from the user using, for example, bags of binary words with image-based features, artificial neural network, and the like. Further, the planning component 226 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 202 may stop to pick up a passenger. In at least one example, the planning component 226 may determine a pickup location based at least in part on determining a user identity (e.g., determined via image recognition or received as an indication from a user device, as discussed herein).

A communication connection 210 may enable communication between the vehicle 202 and one or more other local or remote computing device(s). For instance, the communication connection(s) 210 may facilitate communication with other local computing device(s) on the vehicle 202 and/or the drive system(s) 214. Also, the communication connection(s) 208 may additionally or alternatively allow the vehicle 202 to communicate with other nearby computing device(s) (e.g., other nearby vehicles, traffic signals, etc.). The communication connection(s) 210 may additionally or alternatively enable the vehicle 202 to communicate with a computing device 236. The computing device 236 may be at a remote location from the vehicle and the vehicle may communication with the computing device 236 over a network 234.

It will be appreciated that data relating to objects in the environment is used as an example in FIG. 1, but that data may be transferred between different starting and target components, such as between different vehicle hardware, devices, or systems, between the vehicle and remote hardware, devices, or systems, internally between components of computing devices other than the vehicle, or between different computing devices other than vehicle. For example, within the vehicle 202, map data may be transferred from the one or more maps 228 of the vehicle memory 218 to the localization or planning components 220, 226. In some examples, data may be transferred from the planning component 226 to the system controller 224 and/or one or more emitters 208. In some examples, data may be transferred from the system controller 224 to one or more drive systems 214.

To expand, the maps 228 may be used by the vehicle 202 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 228 may be stored based on, for example, a characteristic (e.g., type of entity, time of day, day of week, season of the year, etc.). Storing multiple maps 228 may have similar memory requirements, but increase the speed at which data in a map may be accessed.

The system controller 224 may be configured to control steering, propulsion, braking, safety, emitters, communication, and other systems of the vehicle 202. The system controller(s) 224 may communicate with and/or control corresponding systems of the drive system(s) 214 and/or other components of the vehicle 202. The system controller(s) 224 may be communicatively coupled to one or more sensors of the vehicle sensor system(s) 206.

Emitter(s) 208 may be provided for emitting light and/or sound, and may include interior emitters to communicate with passengers of the vehicle 202 and/or exterior emitter(s) to communicate with pedestrians or other nearby vehicles.

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 214. Furthermore, the drive system(s) 214 may also include one or more communication connection(s) that enable communication by the respective drive system with one or more other local or remote computing device(s).

In some instances, aspects of some or all of the components discussed herein may include any models, algorithms, and/or machine learning algorithms. For example, the component(s) in the memory 220, 240 may be implemented as a neural network. As can be understood in the context of this disclosure, a neural network may utilize machine learning, which can refer to a broad class of such algorithms in which an output is generated based on learned parameters. Data may be transferred within the models/algorithms, between different models/algorithms, or between the models/algorithms and other components of the vehicle.

In order to transfer the data efficiently, the data may be encoded for efficient data transfer from its starting component to its target component. The data may be decoded for use by the target component. The data may be decoded so that it is usable at the target component. The data may be encoded by an encoder 112. The data may be decoded by a decoder 114. The vehicle may include an encoder and/or decoder, such as encoder 230 and 232 stored in the memory 218 of the vehicle computing device 204 in FIG. 2. An encoder 242 and decoder 244 may be provided at other computing devices, such as in the memory 242 of the computing device 236 of FIG. 2. The encoder may be separate from the starting component, or may be incorporated into it. Similarly, the decoder may be separate from the target component, or may be incorporated into it.

The encoder 112 may be configured to perform an encoding process 116 on the data 108 and output encoded data 118. The encoded data 118 may be transmitted to the decoder 114 and decoded according to a decoding process 120 to reconstitute the data 108 from the encoded data 118. The encoded data 118 may be considered to be serialized data. The encoding process 116 may be considered to be a serialization process, while the decoding process may be considered to be a deserialization process.

The encoding process 116 generally comprises the steps of encoding a header 122 at step 128, encoding data of a first data type in a first portion 124 of the encoded data 118 at step 132, and encoding all the data in a second portion 126 at step 134. The first portion 124 is encoded by determining a list of values of the data elements of the first data type at step 130, as will be described in more detail below. At step 130 the list of values may be determined by generating the list of values as the data is accessed and the second portion encoded. In some examples, at step 130, the list of values may be received from an external component or computing device, such as remote computing device 236 or a remote server. The second portion is encoded to include references to the values in the list of the first portion 124 where those values appear in the data. The data may be encoded in the order header 122, first portion 124, second portion 126 as shown in FIG. 1, or may be encoded separately and compiled prior to transmission.

An example of encoded data 118 will now be described. Examples of the encoded data will also be outlined, with reference to the data objects in data 108. The example described below indicates how the encoded data may be structured as well as the format of the encoded data. However, it will be appreciated that combinations of the features of the structure and formats may differ in other examples.

The data may be encoded in a binary format. For the purposes of the examples described in relation to FIG. 1, the encoded data 118 is considered to be encoded in a binary format. In other examples, other formats may be used.

The encoded data 118 has a data structure comprising the header 122, the first portion 124, and the second portion 126. In some examples, the first portion 124 may form part of the header 122. The header 122 includes metadata relating to the encoding and format of encoding of the first and second portions 124, 126. The header 122 may include an indication of the type of encoding used to encode the data. The indication may identify a version of an encoding format used. The header 122 may include an indication of the endianness of the data in the first and second portions 124, 126. The header may have a predetermined length. The length of the header may be achieved by encoding each piece of metadata with a specific length. For example, an identifier of the type of encoding and version may occupy two bytes, while the indication of the endianness may occupy four bytes, meaning that the header has a predetermined length of 6 bytes. The header 122 may be provided at the start of the encoded data 118, as shown in FIG. 1, or, in other examples, in other positions within the encoded data 118.

The first portion of the encoded data may include a list of values of particular data elements. The values in the list may be values of at least a first data type. The first data type may be a string data type. In some examples, the list may comprise values of a plurality of data types. In some examples, a plurality of lists may be generated, each including values of a data type specific to the list. A plurality of lists may be encoded as a plurality of first portions. In the example of FIG. 1, the first portion comprises a list of values having a string data type. Therefore, the first portion may comprise the values of the identifiers, A and B, and the keys of the key-value pairs, X, Y, and Z. If the data were encoded in the order of the data object for pedestrian 106A first and the data object for pedestrian 106B next, the list would contain the value A at a first position, and X, Y, Z, and B at the second to fifth positions respectively. Although X, Y, and Z are repeated in the data object for pedestrian 106B, they are already found in the list from encoding the data object corresponding to pedestrian 106A and so do not need to be repeated.

In some examples, the values included in the list may be values of a first data type having a particular property, such as a length that is greater than a predetermined length threshold. Values of the first data type whose length is greater than the predetermined length threshold may be determined by identifying values of the first data type initially, and then determining from those values which have the threshold length.

The list is encoded in the first portion to provide a look-up table for the second portion. All data associated with the data objects is encoded in the second portion. The format in which the data elements are encoded depends on the data type. For example, by encoding the list of values of the first data type, values of data elements of the first data type do not have to be encoded again in the second portion. Instead, a reference to the list may replace the values of the first data type in the second portion. As described above, the first portion 124 includes the identifier A in a first position the keys X, Y, and Z in the second to fourth positions respectively and the identifier B in a fifth position. In the second portion 126, the data element of the identifier A may therefore be encoded with a reference to the first position in the encoded list. rather than encoding the value of A.

The data elements in the first portion and/or the second portion may be encoded according to indicate a data type, a length, and a value of the data element. In other words, the data may be encoded using a type-length-value scheme. The format of the indications of the data type, length, and value of the data element may vary depending on data type.

The data type of a data element may be represented in the encoded data by a specific type code. The use of type codes to represent data types enables a reference in the encoded data to the data type with a small amount of encoded data while still enabling a high number of different data types to be represented. For example, when encoded in a binary format, using a single byte of encoded data to represent the data type enables 256 different type codes to be used. The type codes may be specified according to a schema, which may be a predetermined specification or key of type codes and their associated data types. In general, any data type may be assigned a type code, meaning that many different kinds of data may be encoded according to the techniques described herein. The encoding described herein is therefore a schemaless encoding format, meaning that the format may be used with any data types and there are no rules or restrictions enforced based on data type because of the encoding format.

The length of a data element may be represented in the encoded data by a field indicating the length. The field may include a binary representation of a length. The length field may comprise on or more bytes. The length field may indicate the length of the value of the data element as encoded in bytes, so that a decoder may interpret the length and determine how many bytes after the length field to decode to recover the value. In these examples, the value of a data element may be encoded as a value field in the encoded data. In some examples, such as where the data element has an array data type, the length may indicate a number of elements in the array.

In some examples, the type code may also indicate the length of the data element. For example, a particular integer data type having a corresponding precision may be indicated using a type code, meaning that a separate field indicating the length is not required. In such examples, the type, length, and value of a data element may therefore be represented in the encoded data by a type code and a field for the encoded value. Encoding using type codes that specify a length of a data element further reduces the size of the resultant encoded data. The speed with which the data may be encoded and/or decoded is therefore improved.

In some examples, one or more type codes may indicate the length and value of the data element. Such encoding further reduces the size of the encoded data, and improves the speed with which the data may be encoded and/or decoded. A type code may be used to indicate the length and value of the data element for data elements of specific data types. For example, data elements of data types such as a Boolean data type may be encoded using a type code only. Boolean values such as TRUE and FALSE may be encoded directly using a type code that is specific to the Boolean value. In other words, a type code may indicate that the data type is Boolean, the length of the value is the length of the Boolean value, and that the value is TRUE or FALSE, or another Boolean value. The data type, length, and value for these data types where a type code indicates all three pieces of information may be determined from the schema that is particular to the data. This may reduce the amount of encoded data used to encode Boolean values to 1 byte. Specific values of integers or other data types may also be encoded in this way, such as, for example null or zero values, which may also be directly encoded using a type code only. Several different type codes may be specified for zero values to ensure that an integer of the correct length is decoded.

For data elements having a data type for which values are collated into a list, the data elements may be encoded in the second portion with a field containing a type code to indicate that the value may be found in the list, and a field containing an index or reference to indicate the position of the value of the data element in the list. A field indicating a length of the index or reference indicating the position may also be included between the fields for the type code and the index. Accordingly, this encoding also conforms to the type-length-value scheme. The position of the value in the list may be provided as a data offset. In some examples, the position of the value in the list may be provided as an index count, as will be explained in more detail below. The list of values in the first portion may be encoded to indicate a data type, a length, and a value of each value in the list. Therefore, even though the use of a type code and index for data elements of the data type does not conform to the type-length-value scheme, the values are encoded in a type-length-value elsewhere in the encoded data.

Data elements having the first data type may, in some examples, be encoded into the second portion of data but not have their values in the first portion of data. In other words, some data elements of the first data type may not be indexed. For example, if the first data type is the string data type, this means that the second portion will include references to strings in the list of values, meaning that these strings are not encoded in the second portion in their entirety but are instead encoded as integers in the second portion that refer to the list. The second portion will also include encodings of strings that are encoded in full in the second portion. Accordingly, the strings may be encoded in the second portion as an integer, where they are found in the list of values, or as a string, where they are not found in the list of values. A string, or data elements of the first data type, may not have their values encoded in the list of values if they have a size smaller than a predetermined threshold size. The threshold size may be a number of bytes that are required to encode the string. In some examples, a value may not be included in the list of values if the list of values is longer than a threshold length.

To encode the first portion, the list may be encoded as an array. Encoding the list as an array may include encoding a field indicating an array data type, encoding a field indicating a length of the array, and encoding a field comprising the values of the list as the value of the array. The values of the list may also be encoded to indicate a data type, a length, and a value, and this encoding may be nested within the array encoding. In other words, the field for the values of the array comprises a plurality of sets of a type field, a length field, and a value field, each set being for a value in the list. An example of this using the data shown in FIG. 1 is explained below. In some examples, the data type of the values in the list may be indicated by the type code provided in the field indicating the type for the array. In other words, the type code may specify both that there follows data of an array data type and that the data within the array has a particular data type. Therefore, different type codes may be used for, for example, arrays containing numeric data, arrays containing string data, or arrays containing another type of data. In some examples, the data type of the values in the list may be indicated by a field for the data type specified at the beginning of the values, meaning that the field for the data type of the values is only provided once in the array. After this field, the different values may be encoded with a field for the length and a field for the value. These aspects may be implemented for lists including values having the same data type, so a single type code may be used to specify the data type of each of the values in the list. By specifying the data type of the values in the list once, the amount of encoded data may be reduced. The first portion may be encoded to avoid encoding references to the list of values.

In some examples, the first portion may be encoded as an associative array, with key-value pairs in which the key corresponds to the values of the list of values, and the value corresponds to the position or index count of that value in the list.

In some examples, the data may be compressed during encoding to further reduce the size of an encoded data element. An encoded data element with less size reduces the amount of data to be transferred or stored. This may be achieved by determining a smallest precision at which a value of a data element may be encoded, and encoding the value according to the smallest precision. This may be performed for numeric data types. Precision refers to the number of bits that are used to express a value. The smallest precision is therefore the smallest number of bits that may be used to express the value. The smallest number of bits may be in multiples of 8-bits.

To determine a smallest precision, the value of the data element may be compared to threshold values. The threshold values may correspond to maximum values that numeric data types of differing precisions may take. For example, an unsigned 8-bit integer has a maximum value of 255, while an unsigned 16-bit integer has a maximum value of 65535. Accordingly, the value may be initially compared to zero to determine whether the value is zero, and whether the value is a signed or unsigned integer. Upon determining that the value is not zero, the value may be compared to the maximum, threshold values specified for integers or other numeric data types of increasing precision. In other words, for an unsigned integer, the value may be compared to 255, and if it is determined that the value is less than 255, it may be encoded as an unsigned 8-bit integer. For such integer data types, the type code may indicate the data type and the length of the value. The data type may be a numeric data type having the determined precision and the length may correspond to the precision. The value may then be encoded using a length, i.e. a number of bits, corresponding to the precision.

In some examples, the type code may indicate a precision of the original value as well as a precision of the encoded value, to allow decoding back to the original value. For example, if a value has an original data type of an unsigned 16-bit integer, but takes, for example, a value of 240. Accordingly, it may be encoded using a type code that indicates an unsigned 8-bit integer, thereby encoding the data type (unsigned integer) and the data length (8-bit precision, i.e. 1 byte of encoded data). The value may then follow encoded as an 8-bit integer.

To ensure precision, data elements whose value is greater than a threshold size may be encoded to preserve the data during decoding and to prevent rounding of the value. For example, the data element may be a JavaScript® data element with a BigInt data type. The BigInt data type may indicate that the size is greater than the threshold size. BigInt data types may be assigned a type code that specifies that they are a BigInt data type and should be decoded accordingly. BigInt data types may be encoded as 64-bit integers. In some examples, the threshold size may be a maximum integer size or may be determined by performing a round operation. For example, if the value of the data element when rounded is equal to the value, then a first encoding may be used, and if the value when rounded is not equal to the value, a second encoding may be used. For example, these encodings may make use of floating-point formats. A single precision floating point format may be used for values that would not lose precision by rounding versus a double precision floating point format may be used for values that would lose precision by rounding.

An example is now provided of how the data in FIG. 1 may appear when encoded into the first and second portions. As described, the first portion may comprise a list of values of a first data type. In the example described above in relation to FIG. 1, the first data type is the string data type. A list of values of the data elements of the data objects in data 108 therefore comprises the values A, X, Y, Z, and B, in order. As described above, the list may be encoded to indicate an array data type, a length of the array, and the value of the array, and the values within the list may be encoded within the array encoding to indicate the string data type, the length of each value, and the value itself. For the purpose of demonstration only, let it be assumed that the type code for the string data type is 1 and the type code for the array data type is 2. Below is provided a table showing an example of the sequence of fields (which in this example are each 1 byte long but in other examples may be longer, for example where the values are longer than a single letter) that will make up the encoded first portion in the example of FIG. 1. It will be understood that for the purposes of this example, the fields are not expressed in binary as they would be in the encoded data. Furthermore, a header portion is not depicted in this example, but can be assumed to be 6 bytes long, for the purposes of discussing alignment and padding below. In the table, the encoding in the fields are provided in the left-hand column, while the element they refer to is explained in the right-hand column:

| Encoding | Meaning |
| --- | --- |
| 2 | The data type of the data element is an array data type |
| 5 | The length of the encoded array is 5 elements (corresponding to 5 strings) |
| 1 | The data type of this value in the array is a string data type |
| 1 | The length of the value is 1 byte |
| A | The value is A |
| 1 | The data type of this value in the array is a string data type |
| 1 | The length of the value is 1 byte |
| X | The value is X |
| 1 | The data type of this value in the array is a string data type |
| 1 | The length of the value is 1 byte |
| Y | The value is Y |
| 1 | The data type of this value in the array is a string data type |
| 1 | The length of the value is 1 byte |
| Z | The value is Z |
| 1 | The data type of this value in the array is a string data type |
| 1 | The length of the value is 1 byte |
| B | The value is B |

As there are 6 bytes in the header and a further 17 bytes in the encoded list of values, 1 byte of padding may be incorporated after the encoding in the table to ensure that the correct alignment (i.e. in multiples of 8 bytes) is achieved before the second portion of data. This is not shown in the tables for clarity.

The second portion will subsequently be encoded with both encoded data elements that reference the first portion above and encoded data elements that are encoded to indicate a data type, a length, and a value of the data element. For the purpose of this example, it will be assumed that data elements whose value has been included in the list value will have a type code of 3. This data type may be referred to as an indexed value or indexed string. It will be assumed that numeric data types have a type code of 4, that associative arrays (which may be referred to as objects in JavaScript®) have a type code of 5, and that zero values have a type code of 6. So, for example, for the data object having identifier A, the encoding may be as shown in the table below. Numeric data types are encoded in this example with a single type code to enable the type-length-value format to be demonstrated fully. However, in other examples, there may be a plurality of different numeric data types such as integers, both signed and unsigned, floating point numeric types (including floats and doubles), or BigInts. As with the other table, the left-hand column provides a field, expressed not in the binary format of the encoding for clarity, and the right-hand column provides an explanation of the purpose of the field.

| Encoding | Meaning |
| --- | --- |
| 3 | The data type of the element is an indexed string data type |
| 0 | The string is indexed at the index position 0 (i.e. the first value in the list), so the value of this element is A. |
| 5 | The data type of the element is an associative array data type |
| 3 | The length of the associative array is 3 key-value pairs (because this corresponds to an associative array, which, by definition, comprises key-value pairs) |
| 3 | The data type of this element, the key of the first key-value pair, is an indexed string data type |
| 1 | The string is indexed at the index position 1 (i.e. the second value in the list), so the value of this element is X |
| 6 | The data type of this element, the value of the first key-value pair, is a numeric data type having a zero value |
| 3 | The data type of the element, the key of the second key-value pair, is an indexed string data type |
| 2 | The string is indexed at the index position 2 (i.e. the third value in the list), so the value of this element is Y |
| 4 | The data type of the element, the value of the second key-value pair, is a numeric data type |
| 1 | The length of the element is 1 byte |
| 1 | The value of the element is 1 |
| 3 | The data type of the element, the key of the third key-value pair, is an indexed string data type |
| 3 | The string is indexed at the index position 3 (i.e. the fourth value in the list), so the value of this element is Z |
| 4 | The data type of the element, the value of the third key-value pair, is a numeric data type |
| 1 | The length of the element is 1 byte |
| 2 | The value of the element is 2 |

Having encoded the data 118, it may be transmitted to the decoder 114. The decoder 114 may perform the decoding process 120 to obtain the original data 108 from the encoded data 118. The decoding process 120, as shown in FIG. 1, comprises the steps 136, 138, and 140 of decoding the header 122, decoding the first portion 124 to obtain the list of identifiers, and decoding the second portion 126 to obtain the data objects, based on the list of identifiers. In step 140, references to the first portion 124 may be found by the decoder in the second portion 126, and the decoder 114 may be configured to compare the reference or index value to the list decoded from the first portion 124 to determine which value to return.

Figure 3:
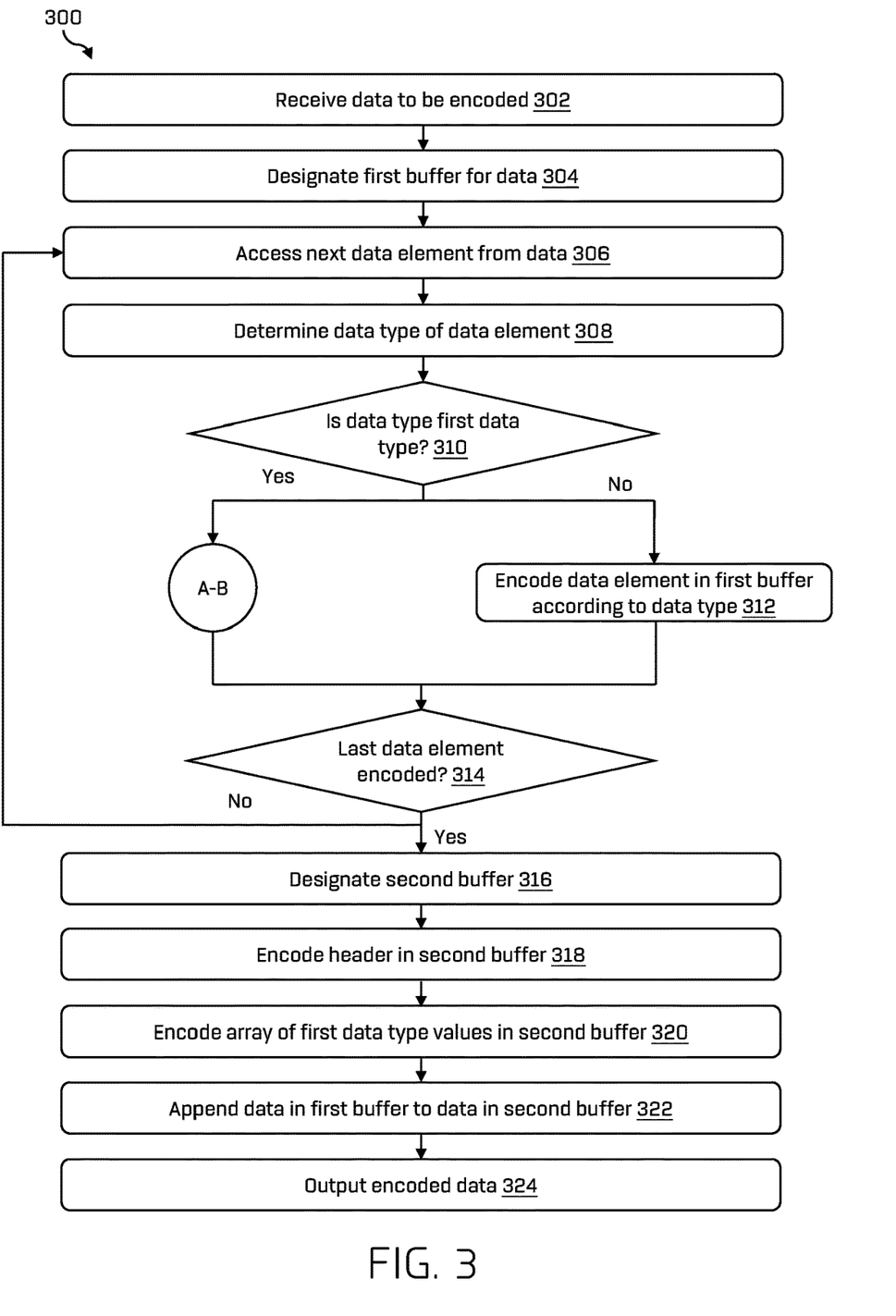
FIG. 3 depicts a flow chart of an example encoding process for encoding data into an encoded format.

FIG. 3 illustrates a flow chart of an example encoding process 300. The example encoding process 300 can be considered to correspond to the encoding process 116 of FIG. 1, and generally performs each of the steps described in relation to the encoding process 116. The encoding process 300 may be performed by an encoder, such as encoders 112, 230, or 242.

As can be seen in FIG. 3, the process 300 include, at step 302, receiving data to be encoded. This may be, for example, the data 108 from FIG. 1. The data may be received at an encoder performing the encoding process 300.

At step 304, a first data buffer may be designated. The first data buffer is a buffer for encoding the second portion of encoded data. The buffer may initially have a length of zero and data may be written to the buffer as it is encoded.

At step 306, a next data element may be accessed from the data and the value of the data element is determined. Initially, the next data element is the first data element of a plurality of data elements. For example, if the encoding process 300 were performed on data 108 of FIG. 1, the identifier A of data 108 may initially be accessed for encoding as the next data element at step 306. This step and the following steps until step 314 may be repeated for each data element. The encoder may be configured to encode several data elements in parallel. The first data element to be accessed may differ in other examples, and may depend upon how the data is arranged when received by the encoder.

At step 308, the data type of the data element that has been accessed is determined. The data type may be one of a number data type, a BigInt data type, a character data type, a string data type, a Boolean data type, or an array data type. Number data types may include integer data types and floating point data types. Integer data types may include, for example, signed integers, and unsigned integers. Floating point data types may include single precision and double precision floating point data types. Array data types may include typed arrays and arrays. In some examples, determining the data type, at step 308, may also include determining if the value of the data has a particular value. For example, it may be determined whether the value of the data is null or zero. The particular values may be encoded using a type code.

After the data type is determined, in some examples it may be determined whether the data can be expressed in a more compact form. As described above in relation to FIG. 1, the format may include compressed type codes, indicating that the value had a particular data type prior to encoding but that it has been encoded as a type of a smaller size.

At step 310 it may be determined if the data type determined in step 308 is a first data type. The first data type is data that is to be provided in the list of values in the first portion of the encoded data. For example, the first data type may be a string data type.

In some examples, steps 308 and 310 may be combined. In some examples, a sequence of determinations of the data type may be performed and corresponding actions taken based on the determined data type. For example, for each value the encoder may perform a sequence of determinations to identify data types in the following order: number, BigInt, typed array, string, array, Boolean, and values that are encoded as types.

As shown in FIG. 3, if the data type of the data element is determined to be the first data type in response to step 310, i.e. 'Yes' in response to 310, process A-B may be performed. Process A-B is shown in FIG. 4.

Figure 4:
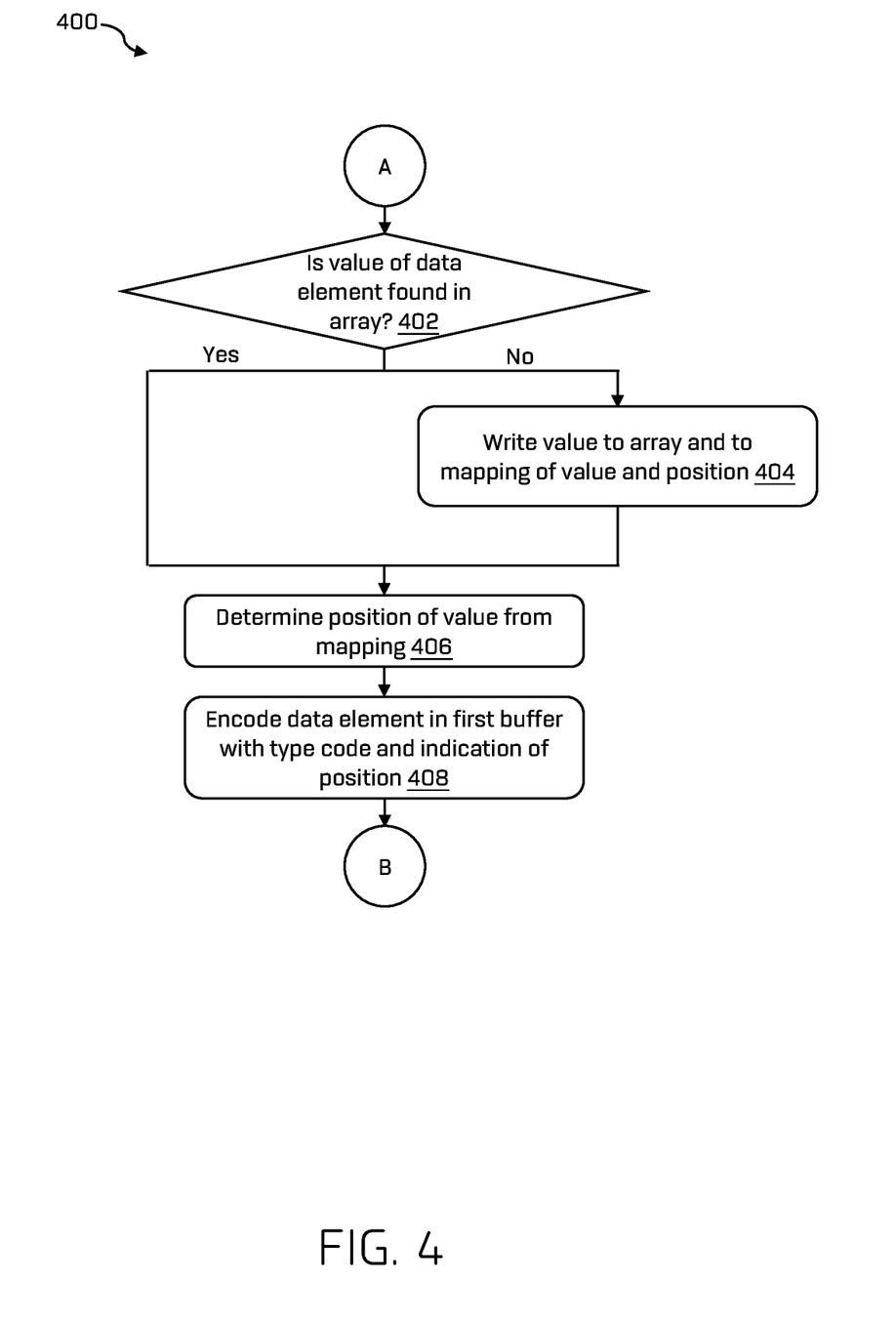
FIG. 4 depicts a flow chart of an example process for encoding a first data type in the encoding process of FIG. 3.

Beginning at A in FIG. 4, at step 402 it may be determined if the value of the data element is found in an array. The array comprises a list of values of the first data type, which, as described above in relation to FIG. 1, will form the first portion of the encoded data and are used as a look-up table for data in the second portion. If the value of the data element is not found in the array, i.e. 'No' in response to 402, then the process may move to step 404. At step 404, the value is added to the array and to a mapping that links the value and its position, which may also be referred to as an index or index value, in the list. The mapping may be implemented as an associative array that includes key-value pairs, in which the key of the key-value pair corresponds to the value being added to the list and the value of the key-value pair corresponds to the position in the list. After step 404, the process moves to step 406. If the value of the data element is already found in the array, i.e. 'Yes' in response to 402, then the process may move to step 406. At step 406, a position of the value of the data element in the array is determined from the mapping. In other words, the value is looked up in the mapping and the position determined. As the order of the mapping and array are aligned, the position of the value in the mapping, according to the value of the key-value pair, will be the same as the position in the array. At step 408, the data element may be encoded in the first buffer with a first field comprising the type code and a second field comprising the index of where the value is found in the array. The type code indicates that the value is found in the index. In some examples, step 402 may be performed with reference to the mapping.

In some examples, the first buffer may have a limited size. Accordingly, prior to performing step 404, it may be determined whether the first buffer is full. If the first buffer is not full, step 404 may be performed. If the first buffer is full, the data element may be encoded according to a different encoding format corresponding to the first data type. For example, the data element may be encoded using a type-length-value scheme, where the type indicates that it is a data element of the first data type that is not included in the array.

In some examples, it may be determined whether the value is greater than a threshold length or size. The encoding of the data element in step 408 and the encoding of the value of the data element in the array and mapping may differ depending on whether the value is greater than the threshold size or smaller than the threshold length or size.

Returning to FIG. 3, if the data type of the data element is determined to be a different data type to the first data type in response to step 310, i.e. 'No' in response to 310, the data element may be encoded in the first buffer according to its data type at step 312. For example, data elements of a second data type may be encoded in according to a type-length-value scheme as described above. For example, the first data type may be a string data type and the second data type may be a number data type. Encoding at step 312 may comprise storing, in the first buffer, an indication that the data element has the second data type, an indication of the length of the value of the data element, and an indication of the value of the data element.

In some examples, data elements of a third data type, such as Boolean or elements having a particular value like null or zero, may be encoded using a type scheme, in which a type code only is used to indicate the value. For these values of the third data type, encoding at step 312 may comprise writing, to the first buffer, a binary code indicating both that the element has the third data type and the value of the data.

Following the encoding, it may be determined whether the last data element in the data has been encoded. If the last data element has not been encoded, the encoding process of steps 306 to 314 may be repeated.

Once all data elements in the data have been encoded, a second data buffer may be designated, as at step 316, and a header may be encoded into the second buffer, as in step 318. The header may comprise metadata relating to the encoding, as described above in relation to FIG. 1.

After the header, the array may be encoded in the second buffer at step 320. The values of the array may be encoded according to a type-length-value scheme. Alternatively, the values may be encoded using a length-value scheme, as the data type of each is the same. The data type may be indicated using a single type code at the beginning of the array. The array itself may also be encoded using a type-length-value scheme. The type code used for the array may indicate the type of values within the array, such that the length-value scheme may be used for encoding the values. In other words, encoding the array at step 320 may comprise writing, to a second buffer, a field indicating an array data type and a further field indicating a length of the array of values, and one or more further fields representing the array of values.

Having encoded the array, the data from the first data buffer may be appended to the data in the second buffer at step 322. The data from the first data buffer therefore forms the second portion of data as described in relation to FIG. 1 above, while the data in the second buffer initially comprises the header, then the header and the first portion. The first portion comprises the encoded array, or list as referred to above, of values. It will be appreciated that although an array is described in relation to FIG. 3, a list or index of values may be implemented in other ways, such as by using a third buffer and encoding the values directly into the list.

At step 324, the encoded data may be output and transmitted to a decoder for decoding at a different component or for storage in memory.

Figure 5:
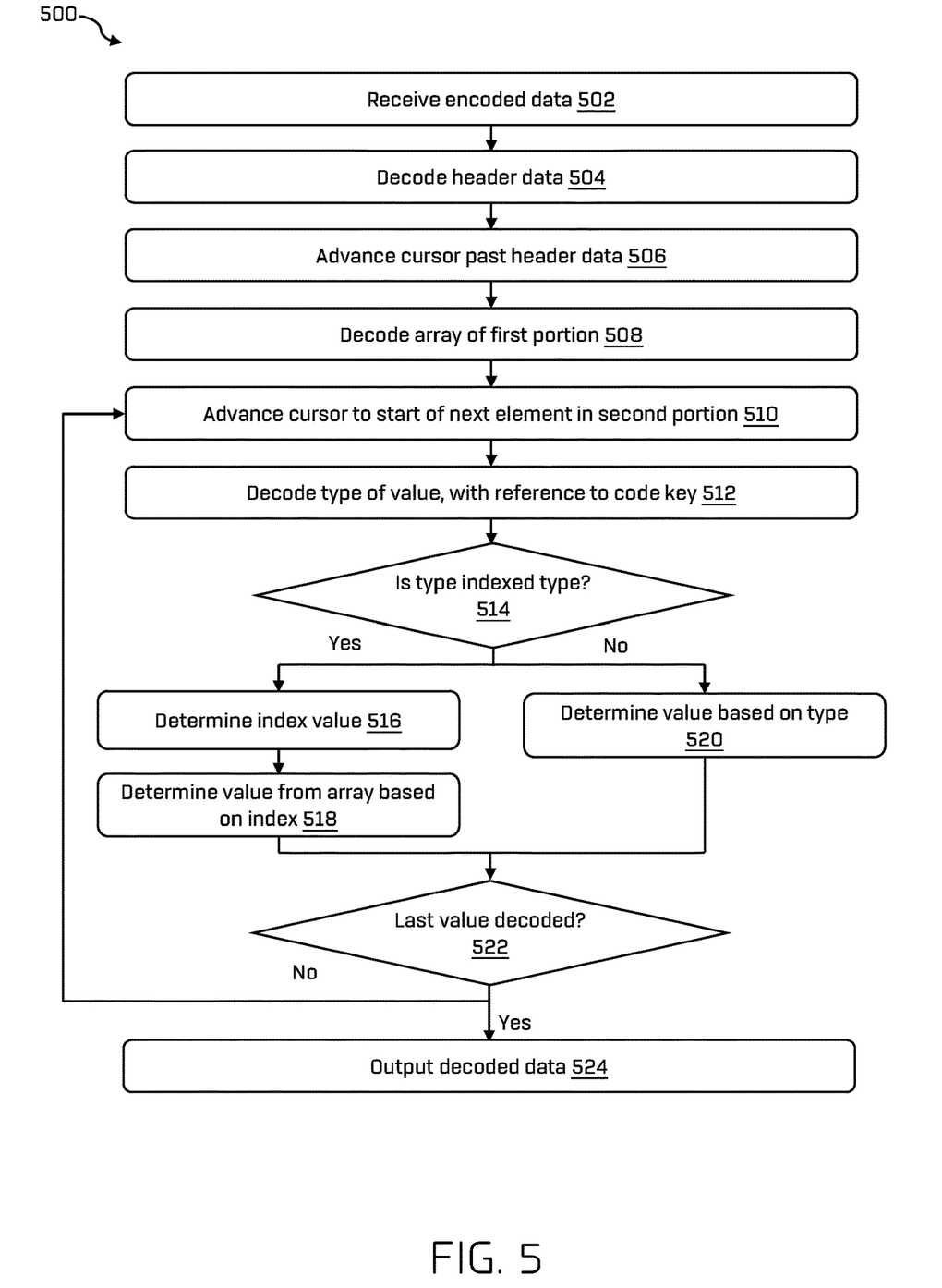
FIG. 5 depicts a flow chart of an example decoding process for decoding data from an encoded format.

FIG. 5 illustrates a flow chart of an example decoding process 500. The example decoding process 500 can be considered to correspond to the decoding process 120 of FIG. 1, and generally performs each of the steps described in relation to the decoding process 120. The decoding process 500 may be performed by a decoder, such as decoders 114, 232, or 244.

As indicated in FIG. 5, the process 500 may include, at step 502, receiving the encoded data. The encoded data may be received directly from the encoder or may be received from a different component of a computing device.

At step 504, the header may be decoded. For example, if the encoding type and the endianness are indicated in the header, then these may be decoded by reading the binary encoding in the header for each of the encoding type and endianness and determining to which encoding type and endianness the binary corresponds.

At step 506, a cursor is advanced past the header of the data. The cursor may be a number indicating the position to which the decoder has decoded in the data, and may be expressed in bytes.

At step 508, the first portion of the encoded data, which represents the array of values, may be decoded. The array may be decoded by determining, from a first field of the first portion, a data type based on a type code and with reference to a schema. The type code may indicate an array data type. In a next field, the length of the array may be determined. The values of the array may have been encoded in the type-length-value format, after the field that indicates the length of the array. Therefore, each value in the array may be decoded by determining each value based on an indicated data type and length of the value stored in subsequent fields.

Having parsed the array and decoded the array of values, the cursor may be advanced past the first portion to the start of the first element of the second portion, at step 510. This may be achieved by advancing the cursor past padding incorporated into the first portion to ensure that the second portion is 8-byte aligned. The decoder may then determine each value in turn from the encoded data, between steps 512 and 522.

Alignment and padding may be incorporated as appropriate to ensure correct alignment where necessary during encoding, and may be accounted for during decoding.

At step 512, the type of the data element being considered may be determined. This may be determined with reference to the schema that indicates the correspondence between the type codes and the data types.

At step 514, it may be determined whether the type indicates that the data element has an indexed data type. In other words, it may be determined if that data element has a value that may be found in the array of values.

If the data type is an indexed data type, 'Yes' in response to step 514, then the next binary code may be determined as an index value at step 516, and used to determine the position in the array of the value, and, based on the array, the value itself, at step 518.

If, in response to step 514, the answer is 'No', and the data type is not an indexed data type, the value may be determined based on the type. For example, the data type may indicate that a type of element encoded with the type-length-value scheme, so a field indicating the length may be decoded and the value itself from a subsequent field.

The process may be repeated at steps 522 and 512 until each of the values has been decoded from the second portion. At step 524, the decoded data is output to, e.g. a different component.

Depending upon the encoding and/or the programming language in which the method of FIG. 5 is used, alignment of the cursor may also be required at other points in the method to avoid data misalignment and errors in reading values such as typed arrays.

EXAMPLE CLAUSES

A: A system comprising: a first computing device having: one or more processors; and one or more computer-readable media storing instructions that, when executed by the one or more processors, cause the first computing device to perform operations comprising: receiving JavaScript data from a first application, the JavaScript data comprising a plurality of data elements, wherein each data element has an associated data type, a length, and a value; encoding the JavaScript data to form a serialized, binary data stream comprising a header and a body, wherein: the header comprises a list of the values of data elements from the plurality of data elements that have a string data type, the list of values being encoded to include fields corresponding to the string data type, the length, and the value for each value in the list of values; and the body comprises the plurality of data elements encoded to include, for each data element having the string data type and whose value is found in the list of values, fields indicating that the value of the data element is found in the list of values and the position of the value in the list of values, and, for each data element having a data type different to the string data type, one or more fields indicating the data type, the length, and the value of the data element, wherein the number of fields used to indicate the data type, the length, and the value of the data element is dependent upon the data type and the value of the data element; and storing the data stream in memory and/or transmitting the serialized, binary data stream to a second computing device for decoding.

B: A system as clause A describes, comprising: a second computing device having: one or more processors; and one or more computer-readable media storing instructions that, when executed by the one or more processors, cause the first computing device to perform operations comprising: receiving, from the first computing device the serialized, binary data stream; decoding the serialized, binary data stream to recover the JavaScript data, including decoding the header of the serialized, binary data stream to generate the list of values and decoding the body of the serialized, binary data stream to recover the plurality of data elements with reference to the list of values; and storing the Javascript data in a data store.

C: A system as clause A or clause B describe, wherein the body is encoded to include, for a data element having a numeric data type, a field that indicates both the data type and the length of the data element, and a field that indicates the value.

D: A system as any one of clauses A to C describe, wherein the body is encoded to include, for a data element having a Boolean data type and/or for an element having a zero or null value, a field that indicates the data type, the length, and the value of the data element.

E: A computer-implemented method comprising: determining data to be encoded, wherein the data comprises a plurality of data elements that each have a corresponding data type, length, and value; determining a list of values of data elements having a first data type; encoding the list of values as a first portion of encoded data including an indication of the first data type, the length of each value in the list of values, and the value of each value in the list of values; encoding the plurality of data elements as a second portion of encoded data, wherein for each data element having the first data type and whose value is included in the list of values, the second portion of encoded data includes an indication of a position of the value of the data element in the list of values, and wherein for each data element having a second data type, the second portion of encoded data includes an indication of the data type, an indication of the length, and an indication of the value of the data element; and transmitting the encoded data for storage and/or decoding.

F: A method as clause E describes, wherein the first portion of encoded data includes an indication of an array data type, an indication of a length of the encoded list of values, and the encoded list of values.

G: A method as clause E or clause F describes, wherein the list of values is generated based on the second portion of encoded data.

H: A method as clause G describes, wherein encoding the plurality of data elements as the second portion of encoded data comprises: determining that a data element has the first data type; determining that the value of the data element corresponds to a value in the list of values; determining the position of the value of the data element in the list of values; and storing in a buffer for the second portion of encoded data a field indicating that the value corresponds to a value in the list of values, the indication of the position of the value in the list of values, and, before the indication of the position of the value in the list of values, a length of the indication of the position of the value in the list of values.

I: A method as clause G or clause H describes, wherein encoding the plurality of data elements as the second portion of encoded data comprises: determining that a data element has the first data type; determining that the value of the data element does not correspond to a value in the list of values; adding the value of the data element to the list of values; determining the position of the value of the data element in the list of values; and storing in a buffer for the second portion of encoded data a field indicating that the value corresponds to a value in the list of values, the indication of the position of the value in the list of values, and, before the indication of the position of the value in the list of values, a length of the indication of the position of the value in the list of values.

J: A method as any one of clauses G to I describe, wherein encoding the plurality of data elements as the second portion of encoded data comprises: determining that a data element has the second data type; determining the length of the data element; storing in a buffer of the second portion of encoded data the indication of the data type of the data element, the indication of the length of the data element and the value of the data element.

K: A method as clause J describes, wherein the second data type comprises a numeric data type, and wherein encoding the plurality of data elements as the second portion of encoded data further comprises: determining, based on the value of the data element, a smallest precision for encoding the value; storing in the buffer of the second portion of encoded data a field comprising an indication of a numeric data type having the smallest precision and a length corresponding to the smallest precision, and a field comprising the value of the data element at the smallest precision.

L: A method as any one of clauses E to K describe, wherein the indication of the data type comprises a code, and wherein the method comprises: determining, for each data element, the data type; and determining the code corresponding to the data type based on a schema of data types and corresponding codes.

M: A method as any one of clauses E to L describes, wherein the first data type comprises a string data type.

N: A method as any one of clauses E to M describe, wherein for each data element having the second data type, the indication of the data type and the indication of the length are represented by a single code.

O: A method as any one of clauses E to N describe, wherein for each data element having a third data type, the second portion of encoded data includes a field that indicates the third data type, the length of the data element, and the value of the data element.

P: A method as any one of clauses E to O describe, wherein the third data type comprises a Boolean data type or a number data type having a zero or null value.

Q: A method as any one of clauses E to P describe, wherein the data elements comprises JavaScript data elements.

R: A method as any one of clauses E to Q describe, wherein the data comprises one or more of: video data, coordinate data; velocity vector data; or static contour data.

S: A method as any one of clauses E to R describe, comprising: receiving, at a decoder, the encoded data; decoding, at the decoder, the first portion of the encoded data; decoding, at the decoder, the second portion of the encoded data; and determining, at the decoder, the plurality of data elements based on the first portion and second portion of the encoded data.

T: One or more non-transitory computer-readable media storing instructions executable by one or more processors, wherein the instructions, when executed, cause the one or more processors to perform operations comprising: determining data to be encoded, wherein the data comprises a plurality of data elements that each have a corresponding data type, length, and value; generating a list of values of data elements having a first data type; encoding the list of values as a first portion of encoded data including an indication of the first data type, the length of each value in the list of values, and the value of each value in the list of values; encoding the plurality of data elements as a second portion of encoded data, wherein for each data element having the first data type and whose value is included in the list of values, the second portion of encoded data includes a position of the value of the data element in the list of values, and wherein for each data element having a second data type, the second portion of encoded data includes an indication of the data type, an indication of the length, and an indication of the value of the data element; and transmitting the encoded data for storage and/or decoding.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:
a first computing device having:
one or more processors; and
one or more computer-readable media storing instructions that, when executed by the one or more processors, cause the first computing device to perform operations comprising:
receiving JavaScript data from a first application, the JavaScript data comprising a plurality of data elements, wherein each data element has an associated data type, a length, and a value;
encoding the JavaScript data to form a serialized, binary data stream comprising a header and a body, wherein:
the header comprises a list of the values of data elements from the plurality of data elements that have a string data type, the list of values being encoded to include fields corresponding to the string data type, the length, and the value for each value in the list of values; and
the body comprises the plurality of data elements encoded to include, for each data element having the string data type and whose value is found in the list of values in the header, fields indicating that the value of the data element is found in the list of values and the position of the value in the list of values, and, for each data element having a data type different to the string data type, one or more fields indicating the data type, the length, and the value of the data element, wherein the number of fields used to indicate the data type, the length, and the value of the data element is dependent upon the data type and the value of the data element; and
storing the data stream in memory and/or transmitting the serialized, binary data stream to a second computing device for decoding.

2. The system of claim 1, comprising:
a second computing device having:
one or more processors; and
one or more computer-readable media storing instructions that, when executed by the one or more processors, cause the second computing device to perform operations comprising:
receiving, from the first computing device the serialized, binary data stream;
decoding the serialized, binary data stream to recover the JavaScript data, including decoding the header of the serialized, binary data stream to generate the list of values and decoding the body of the serialized, binary data stream to recover the plurality of data elements with reference to the list of values; and
storing the Javascript data in a data store.

3. The system of claim 1, wherein the body is encoded to include, for a data element having a numeric data type, a field that indicates both the data type and the length of the data element, and a field that indicates the value.

4. The system of claim 1, wherein the body is encoded to include, for a data element having a Boolean data type and/or for an element having a zero or null value, a field that indicates the data type, the length, and the value of the data element.

5. A computer-implemented method comprising:
determining data to be encoded, wherein the data comprises a plurality of data elements that each have a corresponding data type, length, and value;
determining a list of values of data elements having a first data type;
encoding the list of values as a first portion of encoded data including an indication of the first data type, the length of each value in the list of values, and the value of each value in the list of values;
encoding the plurality of data elements as a second portion of encoded data, wherein for each data element having the first data type and whose value is included in the list of values in the first portion, the second portion of encoded data includes an indication of a position of the value of the data element in the list of values, and wherein for each data element having a second data type, the second portion of encoded data includes an indication of the data type, an indication of the length, and an indication of the value of the data element; and
transmitting the encoded data for storage and/or decoding.

6. The computer-implemented method of claim 5, wherein the first portion of encoded data includes an indication of an array data type, an indication of a length of the encoded list of values, and the encoded list of values.

7. The computer-implemented method of claim 5, wherein the list of values is generated based on the second portion of encoded data.

8. The computer-implemented method of claim 7, wherein encoding the plurality of data elements as the second portion of encoded data comprises:
determining that a data element has the first data type;
determining that the value of the data element corresponds to a value in the list of values;
determining the position of the value of the data element in the list of values; and
storing in a buffer for the second portion of encoded data a field indicating that the value corresponds to a value in the list of values, the indication of the position of the value in the list of values, and, before the indication of the position of the value in the list of values, a length of the indication of the position of the value in the list of values.

9. The computer-implemented method of claim 7, wherein encoding the plurality of data elements as the second portion of encoded data comprises:
determining that a data element has the first data type;
determining that the value of the data element does not correspond to a value in the list of values;
adding the value of the data element to the list of values;
determining the position of the value of the data element in the list of values; and
storing in a buffer for the second portion of encoded data a field indicating that the value corresponds to a value in the list of values, the indication of the position of the value in the list of values, and, before the indication of the position of the value in the list of values, a length of the indication of the position of the value in the list of values.

10. The computer-implemented method of claim 7, wherein encoding the plurality of data elements as the second portion of encoded data comprises:
  determining that a data element has the second data type;
  determining the length of the data element;
  storing in a buffer of the second portion of encoded data the indication of the data type of the data element, the indication of the length of the data element and the value of the data element.

11. The computer-implemented method of claim 10, wherein the second data type comprises a numeric data type, and wherein encoding the plurality of data elements as the second portion of encoded data further comprises:
  determining, based on the value of the data element, a smallest precision for encoding the value;
  storing in the buffer of the second portion of encoded data a field comprising an indication of a numeric data type having the smallest precision and a length corresponding to the smallest precision, and a field comprising the value of the data element at the smallest precision.

12. The computer-implemented method of claim 5, wherein the indication of the data type comprises a code, and wherein the method comprises:
  determining, for each data element, the data type; and
  determining the code corresponding to the data type based on a schema of data types and corresponding codes.

13. The computer-implemented method of claim 5, wherein the first data type comprises a string data type.

14. The computer-implemented method of claim 5, wherein for each data element having the second data type, the indication of the data type and the indication of the length are represented by a single field.

15. The computer-implemented method of claim 5, wherein for each data element having a third data type, the second portion of encoded data includes a field that indicates the third data type, the length of the data element, and the value of the data element.

16. The computer-implemented method of claim 15, wherein the third data type comprises a Boolean data type or a numeric data type having a zero or null value.

17. The computer-implemented method of claim 5, wherein the data elements comprises JavaScript data elements.

18. The computer-implemented method of claim 5, wherein the data comprises one or more of: video data, coordinate data; velocity vector data; or static contour data.

19. The computer-implemented method of claim 5 comprising:
  receiving, at a decoder, the encoded data;
  decoding, at the decoder, the first portion of the encoded data;
  decoding, at the decoder, the second portion of the encoded data; and
  determining, at the decoder, the plurality of data elements based on the first portion and second portion of the encoded data.

20. One or more non-transitory computer-readable media storing instructions executable by one or more processors, wherein the instructions, when executed, cause the one or more processors to perform operations comprising:
  determining data to be encoded, wherein the data comprises a plurality of data elements that each have a corresponding data type, length, and value;
  generating a list of values of data elements having a first data type;
  encoding the list of values as a first portion of encoded data including an indication of the first data type, the length of each value in the list of values, and the value of each value in the list of values;
  encoding the plurality of data elements as a second portion of encoded data, wherein for each data element having the first data type and whose value is included in the list of values in the first portion, the second portion of encoded data includes a position of the value of the data element in the list of values, and wherein for each data element having a second data type, the second portion of encoded data includes an indication of the data type, an indication of the length, and an indication of the value of the data element; and
  transmitting the encoded data for storage and/or decoding.

* * * * *